(12) United States Patent
Kralik

(10) Patent No.: US 7,176,992 B1
(45) Date of Patent: Feb. 13, 2007

(54) METHODS OF FABRICATING PDLC OPTICAL DEVICES

(75) Inventor: John C. Kralik, Lansdale, PA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 510 days.

(21) Appl. No.: 09/635,606

(22) Filed: Aug. 10, 2000

Related U.S. Application Data

(60) Provisional application No. 60/148,553, filed on Aug. 12, 1999.

(51) Int. Cl.
*G02F 1/1333* (2006.01)

(52) U.S. Cl. .......................... 349/86; 349/93

(58) Field of Classification Search ............... 349/86, 349/93, 88
See application file for complete search history.

(56) References Cited

U.S. PATENT DOCUMENTS

| | | | |
|---|---|---|---|
| 4,671,618 A | 6/1987 | Wu et al. | 350/347 |
| 4,688,900 A | 8/1987 | Doane et al. | 350/347 V |
| 4,890,902 A | 1/1990 | Doane et al. | 350/347 |
| 5,093,735 A | 3/1992 | Doane et al. | 359/52 |
| 5,200,110 A * | 4/1993 | Obikawa et al. | 252/299.61 |
| 5,448,382 A * | 9/1995 | Land et al. | 349/14 |
| 5,625,473 A * | 4/1997 | Kondo et al. | 349/86 |
| 5,668,651 A * | 9/1997 | Yamada et al. | 349/156 |
| 5,942,157 A * | 8/1999 | Sutherland et al. | 252/582 |
| 6,278,506 B1 * | 8/2001 | Sumiyoshi et al. | 349/86 |
| 6,339,486 B1 * | 1/2002 | Popovich | 359/15 |

OTHER PUBLICATIONS

R.L. Sutherland, L.V. Natarajan, V.P. Tondiglia, and T.J. Bunning, *Bragg Gratings in an Acrylate Polymer Consisting of Periodic Polymer-Dispersed Liquid-Crystal Planes*, Chem. Mater. 5 1533-1538 (1993).

D.C. Flanders, *Submicrometer periodicity gratings as artificial anisotropic dielectrics*, Appl. Phys. Lett. 42 (6) 492-494 (Mar. 15, 1983).

H. Kogelnik, *Coupled Wave Theory for Thick Hologram Gratings*, The Bell System Technical Journal 48 (9) 2909-2947 (1969).

P.S. Drzaic, *Liquid Crystal Dispersions*, (World Scientific, New Jersey, 1995).

* cited by examiner

*Primary Examiner*—Dung T. Nguyen
*Assistant Examiner*—Thoi V. Duong

(57) ABSTRACT

A method of fabricating an optical device by providing a nematic liquid crystal; providing a photo-curable pre-polymer mixture; mixing the nematic liquid crystal with the photo-curable pre-polymer mixture to form a homogeneous nematic/pre-polymer mixture, with the nematic liquid crystal representing greater than 40% (by weight) of the combined homogeneous mixture. Providing a cell including a pair of transparent substrates that are each coated with a transparent conductive layer when creating an electrooptic device and omitting the conductive layers when creating a static device. Separating the substrates by approximately 5–20 μm or greater; filling the cell with the homogeneous nematic/pre-polymer mixture; and photo-curing the nematic/pre-polymer mixture using a spatially inhomogeneous illumination source thereby forming a polymer dispersed liquid crystal (PDLC) film exhibiting low scattering loss and high index modulation.

20 Claims, 6 Drawing Sheets

METHODS OF FABRICATING PDLC OPTICAL DEVICES

CROSS REFERENCE TO RELATED APPLICATIONS

This application claims priority of provisional application Ser. No. 60/148,553 filed Aug. 12, 1999 entitled "Fabrication of Electrooptic Devices" by the present applicant.

STATEMENT OF GOVERNMENT INTEREST

This invention was made partially with U.S. Government support under Contract Nos. F30602-95-C-0238 and F30602-98-C-0079 awarded by the U.S. Air Force. The Government has certain rights in the invention.

FIELD OF THE INVENTION

The present invention relates generally to polymer dispersed liquid crystal (PDLC) films, and, more particularly, to PDLC film fabrication techniques that are useful for the construction of diffractive and non-dispersive optical devices that exhibit high index modulation and low insertion loss.

BACKGROUND OF THE INVENTION

Polymer dispersed liquid crystal (PDLC) materials have been shown useful for the construction of displays and other electrooptic (EO) devices, as pointed out by Drzaic in *Liquid Crystal Dispersions* (World Scientific Publishing Co., Singapore, 1995). Further, for example, Doane et al. in U.S. Pat. No. 4,688,900 describe the construction and operation of scattering mode devices based on PDLC films. Those films are comprised of nematic liquid crystal droplets dispersed in a polymer matrix. The resulting devices exhibit an optical response from a highly scattering state to a substantially clear state in response either to an electric field or by thermal means, through control of the PDLC film temperature. While such films are useful for displays or scattering mode polarizers, they are unsuitable for use in diffractive or non-dispersive optical devices since they exhibit high scattering loss in the visible and near infrared. In addition, the switching time of such devices is generally slow, on the order of 1–50 ms.

Sutherland et al. in U.S. Pat. No. 5,942,157 describe how PDLC materials may be formulated and applied to the fabrication of diffractive and refractive EO elements. In that patent, based upon the materials used, the description points out that devices made with materials comprising above 35% liquid crystal content are highly scattering, and therefore are undesirable for EO devices. In addition, such formulations yield materials with very low values of index modulation. For example, Sutherland et al. report in Chemical Materials 5, 1533–38 (1993) that an index modulation of less than 0.003 was measured in transmission gratings made using PDLC materials with low liquid crystal concentration. Consequently, high contrast gratings that operate in the visible could only be realized in extremely thick gratings, on the order of 50 μm thick. PDLC gratings this thick are impractical for use in both the visible and infrared because they require an extremely high switching voltage, and further, because they are inherently lossy due to scattering.

It is therefore an object of this invention to utilize PDLC materials for diffractive and refractive optical components that exhibit extremely low insertion loss.

It is another object of this invention to obtain high index of refraction modulation in photo-curable PDLC films by curing them with a spatially inhomogeneous illumination source. Such films enable the construction of thin, high efficiency, and low-drive-voltage devices.

It is yet another object of this invention to fabricate PDLC-based EO diffractive and refractive devices that display switching times in the microsecond regime.

SUMMARY OF THE INVENTION

The objects set forth above as well as further and other objects and advantages of the present invention are achieved by the embodiments of the invention described hereinbelow.

The present invention overcomes the problems of high scattering loss and low index modulation in prior art PDLC films utilized for electrooptic diffractive and refractive optical devices. PDLC materials with greater than 40% nematic liquid crystal content (by weight) are used in this invention to fabricate EO transmission gratings that exhibit negligible scattering loss in the near infrared. In addition, these materials also exhibit large index modulation. Therefore, these features enable the use of these PDLC films for optical switching applications.

For a better understanding of the present invention, together with other and further objects thereof, reference is made to the accompanying drawings and detailed description.

BRIEF DESCRIPTION OF THE DRAWINGS

FIG. 7b is an exploded view showing the structure of the PDLC film depicted in FIG. 7a;

DETAILED DESCRIPTION OF THE PREFERRED EMBODIMENTS

The present invention relates to techniques for fabricating diffractive and non-dispersive electrooptic (EO), as well as static, devices using polymer dispersed liquid crystal (PDLC) materials. In particular, the fabrication techniques include photo-activated polymerization-induced phase separation utilizing a spatially inhomogeneous illumination source. The resulting EO devices exhibit low insertion loss, high index modulation, and switching times in the microsecond regime.

Figure 1:
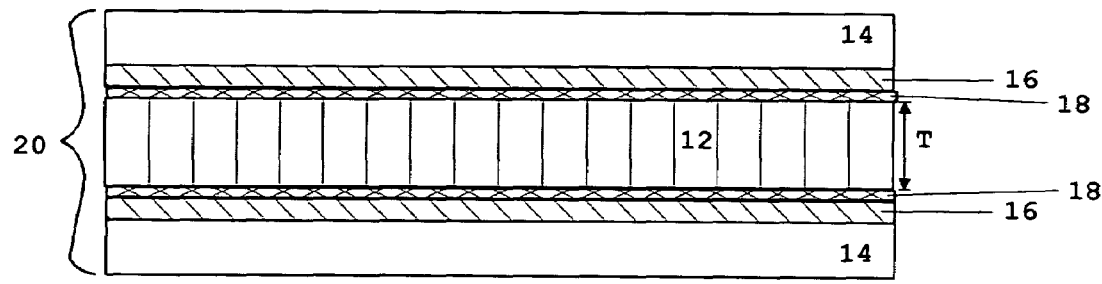
FIG. 1 is a schematic side view of a PDLC EO device.

FIG. 1 illustrates a preferred embodiment of the invention wherein the EO devices are comprised of a PDLC film 12 of thickness T that is preferably approximately 5–20 µm thick or even thicker. The PDLC film 12 is confined in a cell 20 that is comprised of two rigid transparent substrates 14, each coated with a transparent conducting film 16. The transparent conducting films 16 facilitate the application of an electric field across the PDLC film, which is used to vary the optical properties of the PDLC film. Additional transparent dielectric films or multi-layer films 18 may also be coated onto one or both of the transparent conducting films to serve as electrical insulation and/or index matching layers. In an alternative embodiment, the transparent conducting films are not part of the cell, thereby rendering the device static, and not electrically switchable.

Figure 2A:
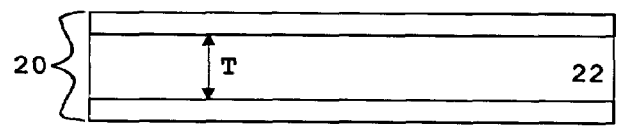
FIGS. 2a, b and c illustrate in schematic fashion a preferred method of fabricating PDLC EO devices.
Figure 2B:
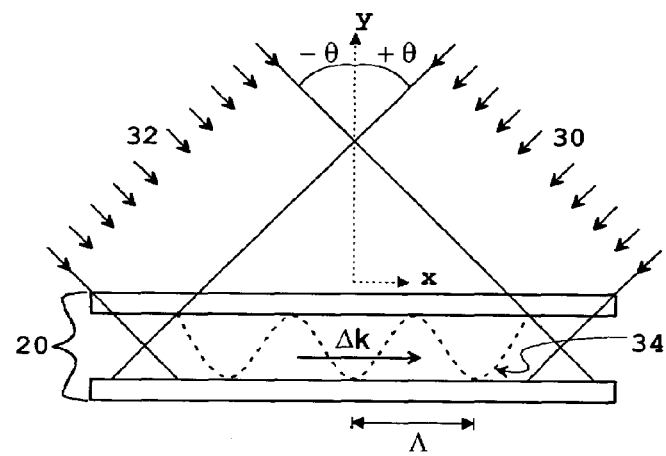
Figure 2C:
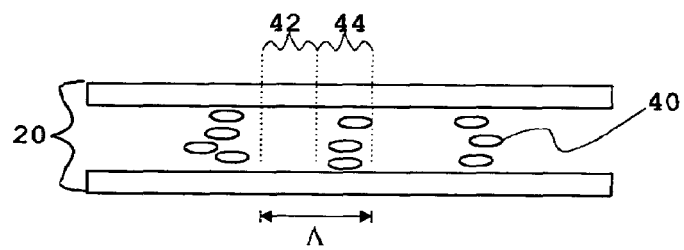

The preferred technique for fabricating the device shown in FIG. 1 is shown in FIGS. 2a–2c. FIG. 2a shows a cell 20 that is similar in construction to the one described above, with thickness T that, as stated above, is preferably approximately 5–20 µm thick or even thicker. This cell is filled with a homogeneous mixture 22 of a nematic liquid crystal material and a pre-polymer material. The nematic liquid crystal concentration is preferably greater than 40% by weight. The preferred nematic liquid crystal is a eutectic mixture that possesses a positive dielectric anisotropy. The preferred pre-polymer material is a photo-curable mixture containing acrylated monomers and oligomers, as well as a suitable photo-initiator. An example of a nematic liquid crystal material that may be utilized to fabricate the EO devices of this invention is one of the TL-nematics from EM Industries of Hawthorne, N.Y.; while an example of the pre-polymer that may be utilized is PN393, also offered by EM Industries.

FIG. 2b shows how to expose the filled cell in order to polymerize, or cure, the pre-polymer component. Two coherent optical beams 30 and 32 are made to intersect inside the cell 20. The beams have equal irradiance and are both s-polarized. In addition, the beams have a wavelength that is near the peak of the absorption band of the photo-initiator component of the pre-polymer mixture. The figure shows that the beams are incident on the cell in the x-y plane at angles of $-\theta$ and $+\theta$ with respect to the cell normal, or y-axis. Under these circumstances, the intersecting beams create an inhomogeneous illumination, or interference pattern 34, inside the cell consisting of alternating bright and dark fringes. The interference pattern is characterized by a grating vector $\Delta k$ that is parallel with the x-axis. The magnitude of the grating vector, or spatial frequency, is given by $|\Delta k|=2\pi/\Lambda$, where $\Lambda$ is the grating period. The grating period is related to the wavelength of the optical beams $\lambda$ by $\Lambda=\lambda/(2 \sin \theta)$.

The spatially periodic illumination pattern 34 shown in FIG. 2b is used to expose the homogeneous nematic/pre-polymer mixture and thereby polymerize the pre-polymer component. A subsequent spatially uniform illumination may be utilized to polymerize any remaining monomers in the cell.

FIG. 2c shows the cured film at the conclusion of the exposure process. The resulting PDLC is comprised of regions 42 containing polymer-rich material separated by regions 44 of nematic liquid crystal-rich material. The nematic-rich regions 44 may contain discrete droplets 40 of nematic liquid crystal-rich material, or may contain inter-connected regions that are filled with nematic liquid crystal-rich material. The exact morphology of these regions 44 depends on the concentration of nematic liquid crystal, the rate of polymerization of the pre-polymer etc. Nevertheless, FIG. 2c shows discrete droplets 40 for the present discussion.

The two distinct regions in the PDLC film form due to phase separation that occurs during the exposure process. The polymer-rich regions 42 reside where the bright fringes occurred during the exposure, and the nematic-rich regions 44 reside where the dark fringes occurred. It should be noted that at the completion of the polymerization process, some nematic liquid crystal remains dissolved in the polymer regions 42, and some pre-polymer material remains in the nematic-rich regions 40. As indicated in FIG. 2c, the spatial period $\Lambda$ of the PDLC film is the same as that of the illumination pattern in FIG. 2b.

Note that although more difficult to realize at high spatial frequencies, an alternative method for producing a spatially varying illumination in the cell is created by passing a spatially uniform optical beam through a patterned mask in contact with the cell.

Note, too, that the configuration shown in FIG. 2c leads to the formation of an unslanted grating. It is clear, though, from Herwig Kogelnik, Bell System Technical Journal 48(9), 2909–47 (1969), that a grating with slanted planes will result when the absolute values of the incidence angles of the two beams 30 and 32 are not equal.

Figure 3:
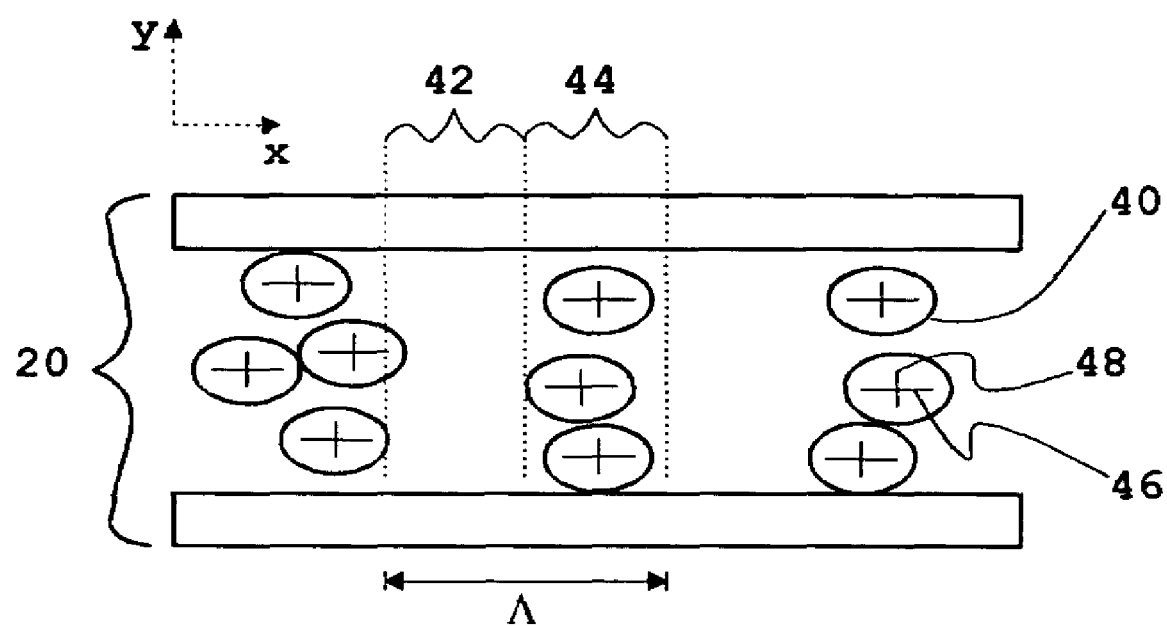
FIG. 3 is a schematic side view of a PDLC device, showing the principle of operation of this invention.

The method described above allows the fabrication of PDLC films with a large, electrically tunable index of refraction modulation. The operation of these PDLC films is illustrated schematically in FIG. 3. This figure shows a PDLC film in a cell 20 prepared according to the text accompanying FIGS. 1 and 2a–c. The spatial period of the PDLC is $\Lambda$, and, as described above, the film contains two distinct regions. One region 42 contains polymer-rich material while the second 44 contains nematic liquid crystal-rich material. Again, the nematic liquid crystal-rich regions 44 comprise either of discrete droplets 40 in a polymer matrix (as shown in the figure), or as inter-connected regions containing the nematic-rich material. In either case, the nematic directors 46 in these regions 44 are substantially aligned along the grating vector—in this case, the x-axis. This alignment is produced by the flow of liquid crystal that takes place during polymerization in the spatially inhomogeneous illumination source. The resulting high degree of orientational order within the nematic rich regions 44 produces a large index of refraction modulation $n_I$ within the film plane. The index modulation, as defined by Kogelnik, is given by $n_I=(n_{LC}-n_p)/2$, where $n_{LC}$ is the index of the nematic-rich regions 44 and $n_p$ is the index of the polymer-rich regions 42.

The optic axis 46 of the nematic-rich regions 44 has a value that is an admixture of the nematic indices, but is weighted most heavily by the extraordinary nematic index $n_e$. Perpendicular to the droplet axis 48, the nematic-rich regions have an index that is weighted most heavily by the ordinary index $n_o$ of the nematic. In the preferred embodiment, the nematic liquid crystal possesses a positive dielectric anisotropy so that when a sufficiently strong electric field is applied across the PDLC cell along the y-axis, the nematic directors reorient along the field, thereby reorienting the optic axis 46 of the nematic-rich regions to lie along the y-axis.

Additionally, the preferred embodiment should utilize a nematic that has $n_o$ approximately equal to $n_p$ and $n_e > n_p$. In this case, the index modulation $n_I$ is a maximum in the absence of an applied field, and zero under a sufficiently strong field as experienced by light polarized in the x-y plane. For light that is orthogonal to this, $n_I$ is nearly zero, and further, this value does not depend on the amplitude of the applied switching field.

These concepts have been substantiated by experimental demonstrations described in the examples below. The examples serve to illustrate several modes of the invention and are not to be construed as a limitation of the present invention.

EXAMPLE 1

Figure 4:
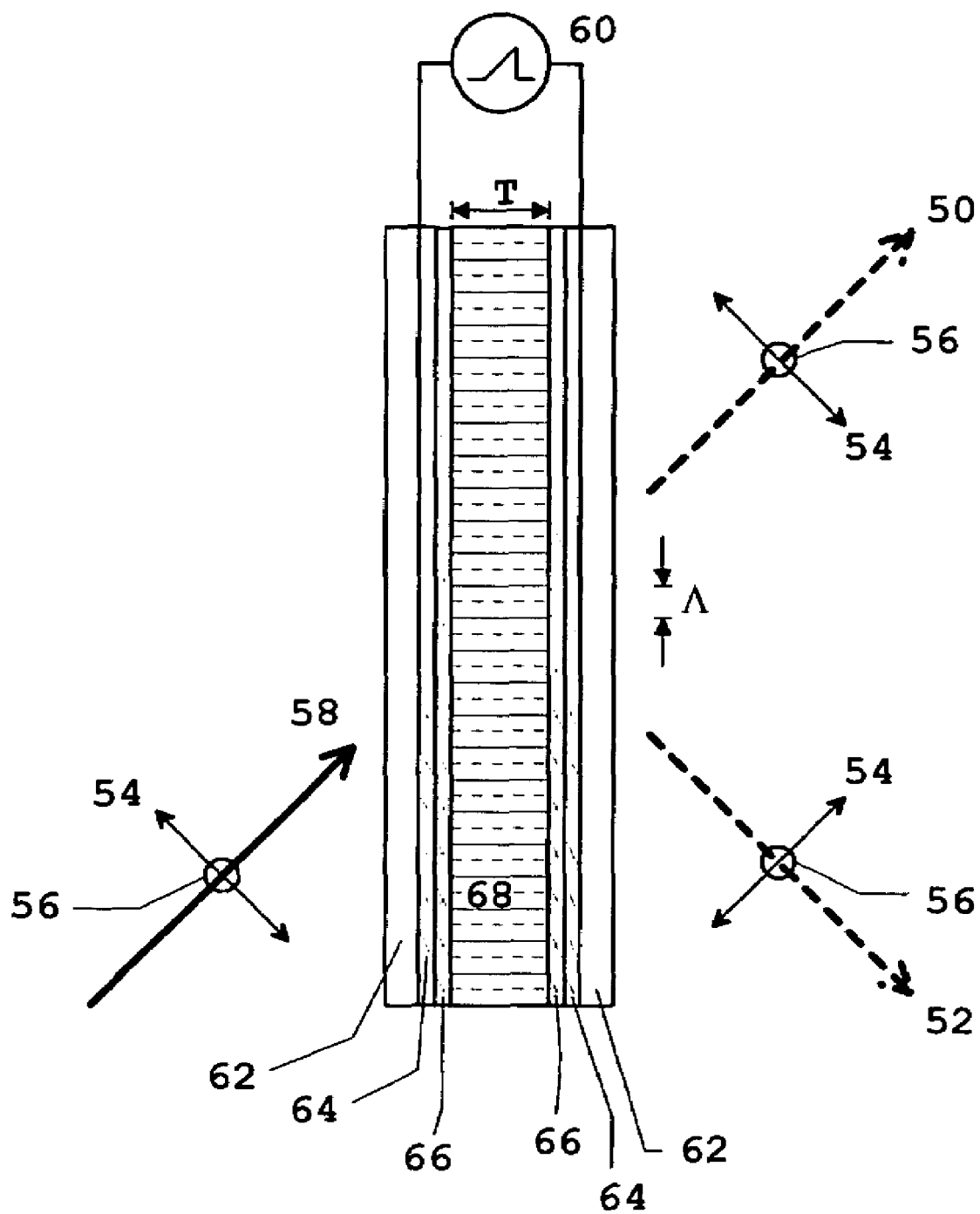
FIG. 4 illustrates schematically a PDLC film of this invention being utilized as a beamsteering device.

FIG. 4 is a schematic diagram of an electrically switched transmission grating fabricated with PDLC materials as provided by this invention. This EO beamsteering device was designed to operate in the near infrared; however, similar switches can operate at select wavelengths throughout the visible to IR. The material utilized to make the grating contained a mixture of 67% (by weight) of a commercially available nematic liquid crystal and 33% (by weight) of a commercially available pre-polymer comprising acrylated monomers and oligomers with a photoinitiator that is sensitive in the UV. The PDLC film 68 was formed by introducing the homogenous nematic/pre-polymer mixture into a cell consisting of two glass substrates 62 coated with a transparent indium-tin-oxide (ITO) conducting film 64. In addition, the ITO films were partially coated with a dielectric insulator 66. Spherical polymer spacers were used to separate the glass substrates; the cell thickness T was 15.4 µm.

A PDLC grating with a period Λ=1.92 µm was recorded in the material via the techniques described earlier. The grating formation process was monitored with a probe laser beam, and the exposure was stopped after the change in probe beam diffraction efficiency reached a suitably small value.

The EO grating was designed to diffract light at a wavelength of 1310 nm though a Bragg angle of 20 degrees (in air). Light 58 incident on the grating at the Bragg angle was either transmitted through the grating in the m=0 order 50 or diffracted into the m=+1 order 52, depending on the value of the applied electric field across the cell. The diffraction efficiency was measured by monitoring the m=0 beam 50 as a function of applied electric field for different beam polarization. Here, s-polarized light 56 refers to an optical wave with an electric field vector oscillating into and out of the plane of the figure, while p-polarized light 54 refers to an optical wave with an electric field vector lying in the plane of the figure.

The PDLC grating was switched by applying an electric field across the cell. This was accomplished by attaching the output of an electrical amplifier 60 to the cell via the ITO films on the two substrates.

Figure 5:
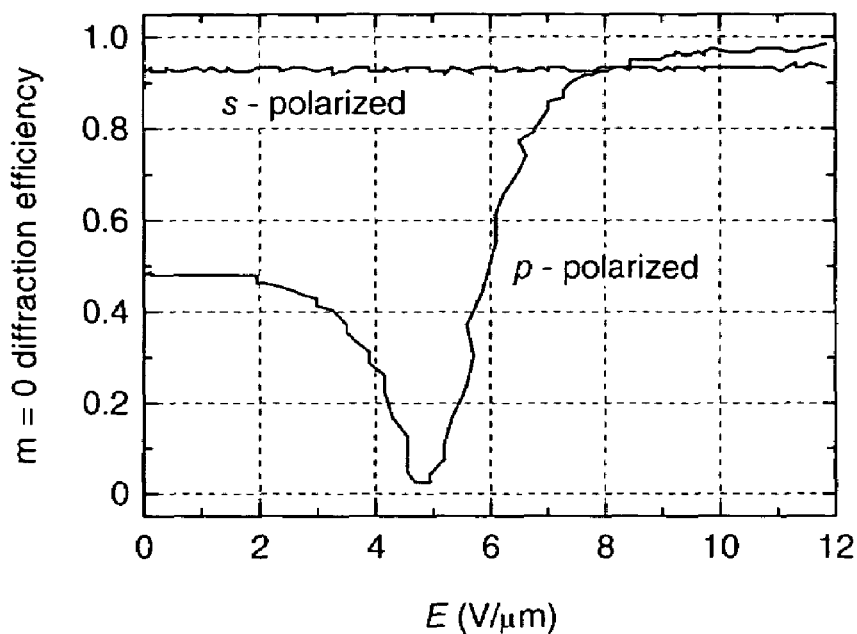
FIG. 5 graphically illustrates experimental data that shows large index modulation that is realized in the current invention. The graph shows the transmitted optical beam power through a PDLC grating versus applied electric field for s- and p-polarized light.

Grating switching results are presented in FIG. 5. This graph shows the diffraction efficiency of the m=0 diffracted beam as a function of applied electric field for s- and p-polarized light. Here, the diffraction efficiency represents the amount of optical power measured in the m=0 beam, normalized to the total power measured in both the m=0 and +1 orders. Additionally, the electric field was derived by dividing the applied voltage value across the cell by the cell thickness. It is evident from this data that the switched grating is effective in switching p-polarized light only. This lends strong support to statements made earlier about the high degree of orientational order in the nematic-rich regions throughout the film.

FIG. 5 also demonstrates the high index modulation that can be achieved in PDLC systems with greater than 40% liquid crystal content. Indeed, this grating is over-modulated since it modulates the p-polarized beam in excess of 100%. That is, the grating modulation is near zero for a high applied field and it reaches a maximum value when the field amplitude is zero. According to a result found in the article by Kogelnik, the m=0 order diffraction efficiency $\eta_p(m=0)$ for p-polarized light is given by $$\eta_p(m=0)\cos^2 v_p$$

where $$v_p = \frac{\pi n_1 T \cos(2\theta)}{\lambda \cos\theta}.$$

Based on the data in FIG. 5, the grating has $v_p$=2.4 radians and $n_I$=0.069 when the field is off. This value of index modulation is some 20 times larger than that achieved using low-nematic-concentration PDLC gratings.

Two additional features of the switched grating are noteworthy. First, the switching time of the grating was about 400 µs. This value is more than two orders of magnitude faster than that of mechanical beamsteering switches and more than one order of magnitude faster than thermo-optic switches, both of which are widely used in the telecommunications arena. The second noteworthy feature is the low value of insertion loss exhibited by the switched grating. In the example shown above, the insertion loss was dominated by Fresnel reflection loss from the two air-glass interfaces of the switching element. If this loss is minimized through the use of anti-reflection coatings, the ultimate insertion loss could be engineered to be just a few percent per switched grating.

EXAMPLE 2

In this example, a low loss, high contrast electrically switched PDLC diffraction grating is demonstrated with a switching time of just 70 µs. The PDLC constituents used are the same as that described in Example 1; however, the nematic/pre-polymer ratio was changed to 1:1 by weight. This lower liquid crystal concentration led to smaller confinement spaces for the nematic-rich material in the PDLC film, and in turn, a faster switching time.

Figure 6:
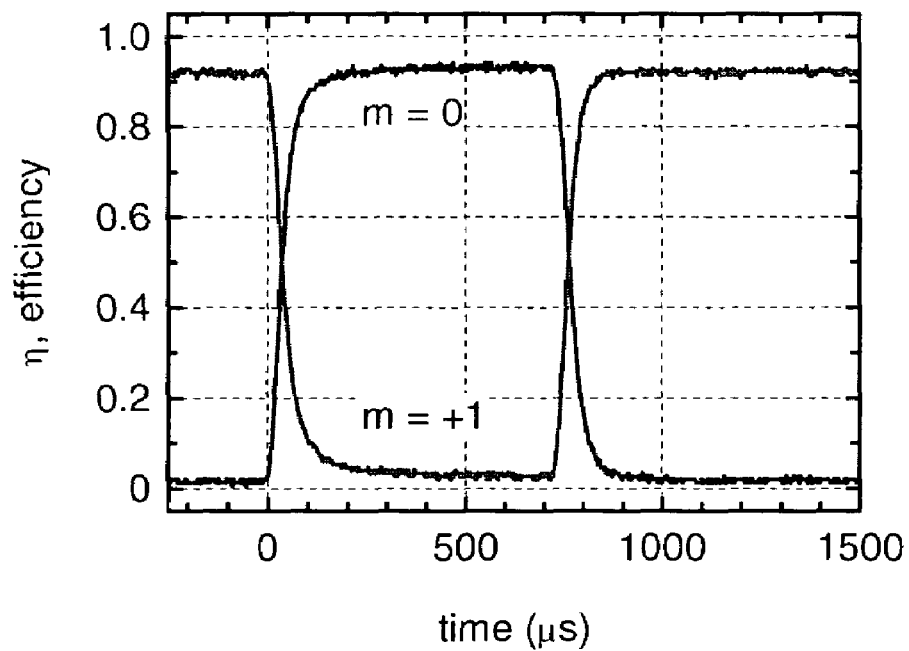
FIG. 6 graphically illustrates experimental switching data at a wavelength of 1310 nm from a grating fabricated using the prescription described in the present invention.

A grating structure was formed in the PDLC film in the same manner as in Example 1, resulting in a grating period of 1.92 µm. The grating thickness in this example was 13.0 µm and the incident optical beam had a wavelength of 1310 nm and was p-polarized. FIG. 6 shows graphically the diffraction efficiency of the m=0 and +1 beams versus time during a switching event that occurs when a voltage pulse is applied across the PDLC cell from time t=0 to t=725 µs. The switching time, which is defined as the average time to transition from the 10% to 90% levels in the efficiency data for the m=0 and m=+1 optical signals after the applied voltage is removed, was measured to be just 70 µs. In addition, the insertion loss of the switch was just a few percent and the contrast ratio was nearly 18 dB.

EXAMPLE 3

The material systems and fabrication technique described in relation to the first two examples were applied to the construction of an EO variable retarder. This retarder is based on a PDLC transmission grating that has a grating period smaller than the wavelength of light to be modulated.

Figure 7A:
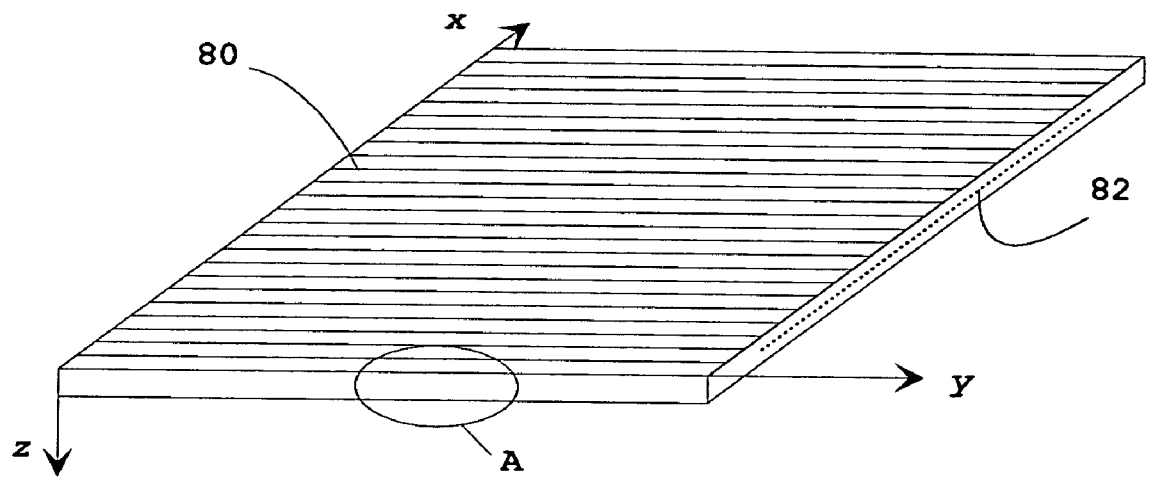
FIG. 7a is a schematic illustration of a refractive PDLC device of this invention that displays variable birefringence.
Figure 7B:
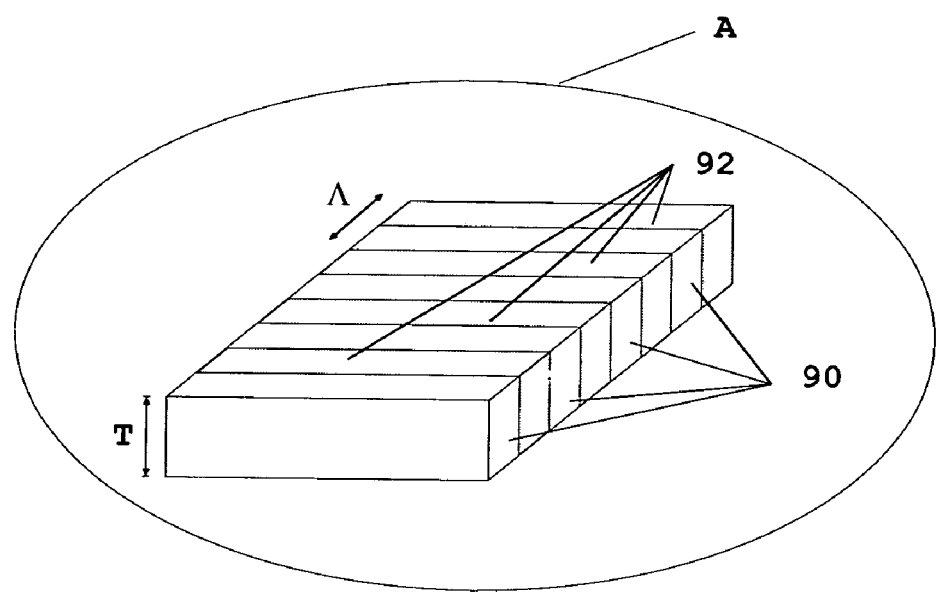

A schematic diagram of a PDLC variable retarder is shown in FIGS. 7a and 7b. FIG. 7a shows the PDLC film 80 in the xy-plane with light incident on the device propagating along the z-axis. The grating vector 82 is parallel to the x-axis. The expanded view in FIG. 7b (labeled A in FIG. 7a shows the underlying structure of the EO film. The film is characterized by thickness T and spatial period Λ; Λ is designed to be smaller than the wavelength of the optical beam to be modulated. The PDLC film contains two distinct regions: polymer-rich regions 90, and nematic liquid crystal-rich regions 92. The presence of a nematic liquid crystal in the film allows it to experience a change in index of refraction on application of an electric field of sufficient amplitude and duration. As was the case in the diffraction gratings described in the text accompanying FIG. 3, the liquid crystal-rich regions 92 exhibit a high degree of orientational order throughout the PDLC film.

The effective film indices of refraction $n_x$ and $n_y$, along the x- and y-axes, respectively, can be estimated knowing the film morphology and the optical indices of the constituent materials. The index of refraction of the material in the polymer-rich regions is taken to be $n_1$, where $n_1$ represents an average value derived from the optical indices of the polymeric material and the liquid crystal material. Specifying the optical properties of the liquid crystal-rich regions is more involved since they contain a high concentration of birefringent nematic liquid crystal material that can reorient under the influence of an applied field. The liquid crystal-rich regions are specified by indices $n_{2x}$ and $n_{2y}$ along the x- and y-axes, respectively. It was shown in Example 1 that the index $n_{2y}$ does not change appreciably under the influence of an applied electric field; however, index $n_{2x}$ changes significantly under the influence of an electric field. With no field applied, the index $n_{2x}$ represents an average value derived from the index of the polymer-rich material and the extraordinary index $n_e$ of the nematic molecules. Under the influence of a sufficiently strong field, though, the nematic molecules reorient so as to align with the substrate normal. In this case, $n_{2x}$ represents an average value derived from the index of the polymer-rich material and the ordinary index $n_o$ of the nematic. Since for most nematic liquid crystal materials $n_e > n_o$, $n_{2x}$ is larger in the absence of an applied field than when a field is applied.

In *Applied Physics Letters* 42(6), 492 (1983), Flanders reports on constructing a static birefringent plate using a composite dielectric structure. The formalism described therein can be tailored to provide a description of the PDLC film shown in FIGS. 7a and 7b. Starting from the Flanders work, the effective indices $n_x$ and $n_y$ of a spatially periodic composite film with a 50% duty cycle and a period much smaller than that of an optical field—i.e. one with Λ<<λ—can be written $$n_x = \frac{1}{\sqrt{\frac{1}{2n_1^2} + \frac{1}{2n_{2x}^2}}}, \quad n_y = \sqrt{\frac{n_1^2}{2} + \frac{n_{2y}^2}{2}}.$$

where the definitions of the indices $n_1$, $n_{2x}$, and $n_{2y}$ are given in the previous paragraph. One of the results of the Flanders work is that the formalism seems to describe the case where Λ<<λ is not strictly met, as long as Λ<λ/2 so that no diffracted orders propagate. As mentioned above, a PDLC film exhibits continuously tunable birefringence $\delta n = n_x - n_y$ through its dependence on $n_{2x}$.

A PDLC retarder was constructed using materials similar to those described in Example 1. The nematic/pre-polymer ratio was 2:1; the grating period was Λ=0.5 μm; and the film thickness was 4.9 μm. The film birefringence was measured in a standard Kerr set-up using a probe beam with a wavelength of 0.6328 μm. Note that negligible optical power was diffracted by the film for light incident normal to the film plane. In this situation, the film birefringence varied between δn=0.048 and δn=0, as an applied electric field was increased from zero to a value sufficient to reorient the nematic dispersed in the film. The switching time of the waveplate was just a few hundred microseconds; however, it is conceivable that this can be reduced to less than 100 μs with further optimization.

Figure 8:
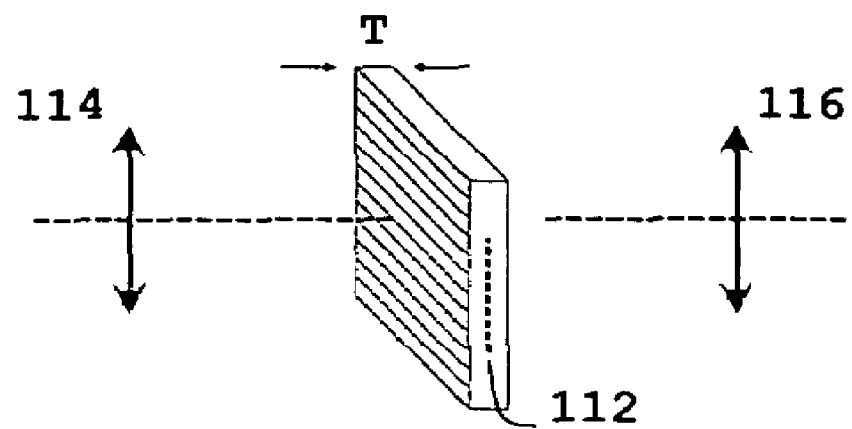
FIG. 8 schematically illustrates the EO film depicted in FIG. 7a being used as a phase modulator.

The variable retarder film shown in FIG. 7a may be utilized as either a phase or amplitude modulator. FIG. 8 demonstrates how the film may be utilized as a phase modulator. The film is characterized by thickness T and grating vector 112, indicated by the dashed line in the figure. An optical beam 114 of unit amplitude and wavelength λ is incident normal to the film plane from the left side of the figure; the beam is linearly polarized parallel to the grating vector. The optical beam 116 acquires a phase shift of $\Delta\phi = 2\pi n_x L/\lambda$ on passing through the film on the right side of the figure. Since the film index $n_x$ depends on the field-dependent index $n_{2x}$, the optical phase change can be varied electrically.

Figure 9:
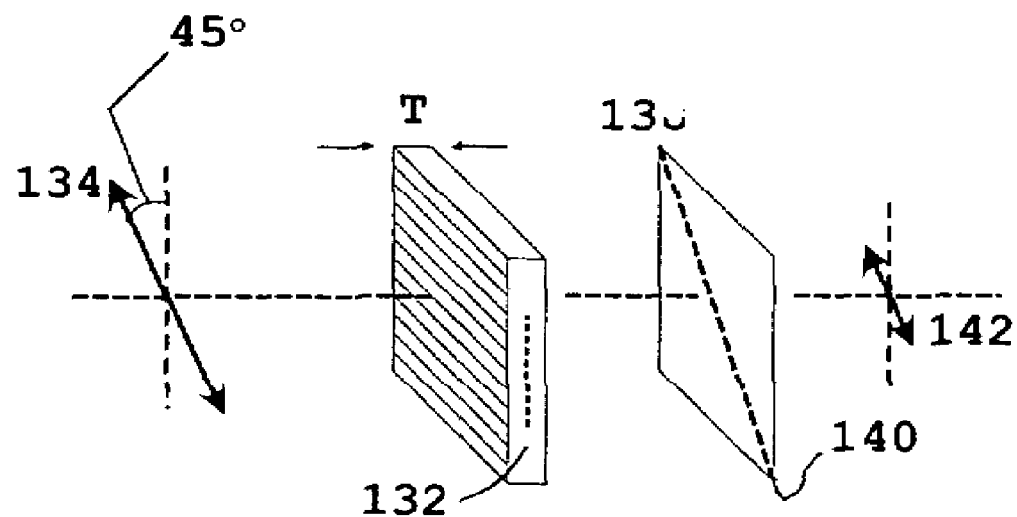
FIG. 9 schematically illustrates the EO film depicted in FIG. 7a being used as an amplitude modulator.

In a similar manner, the PDLC film depicted in FIG. 7a may be utilized as an amplitude modulator. FIG. 9 illustrates how this is accomplished. Again, the PDLC film is characterized by its thickness T and grating vector 132, and an optical beam of wavelength λ is incident on the film perpendicular to the film plane. In this case, though, the incident optical beam 134 is linearly polarized in a plane that makes an angle of 45 degrees to the grating vector. Light exiting the PDLC film next encounters a polarizer 138 with its transmission axis 140 aligned either parallel or perpendicular to the plane of polarization of the incident optical beam. In the example shown in FIG. 9, the transmission axis 140 of the polarizer 138 is oriented parallel to the plane of polarization of the incident beam. In this case, the amplitude 142 of the light exiting the polarizer is proportional to $\sin(\pi \delta n L/\lambda)$. Hence, as the film birefringence δn changes under the influence of an applied field, the optical output power of the beam may be varied from a maximum of unity to a minimum of zero.

Although the invention has been described with respect to various embodiments, it should be realized this invention is also capable of a wide variety of further and other embodiments within the spirit and scope of the appended claims.

What is claimed is:

1. A method of fabricating a diffractive or non-dispersive polymer dispersed liquid crystal electrooptic device, comprising the steps of:

providing a non-chiral nematic liquid crystal in the form of a eutectic mixture, wherein said nematic liquid crystal has a positive dielectric anisotropy;

providing a photo-curable pre-polymer mixture;

mixing said nematic liquid crystal with said photo-curable pre-polymer mixture to form a homogeneous nematic/pre-polymer mixture, with said nematic liquid crystal being greater than 40% (by weight) of said combined homogeneous mixture;

providing a cell comprising a pair of spaced apart transparent substrates that are each coated with a transparent conductive layer, without the inclusion of an alignment layer for aligning said nematic liquid crystal;

filling said cell with said homogeneous nematic/pre-polymer mixture; and photo-curing said nematic/pre-polymer mixture using a spatially inhomogeneous illumination source;

deriving said spatially inhomogeneous illumination source used to photo-cure the nematic/pre-polymer mixture from the interference of two coherent optical beams within said cell; and utilizing the above fabrication method to create said diffractive or non-dispersive electrooptic device in the form of a polymer dispersed liquid crystal (PDLC) exhibiting low scattering loss and high index modulation.

2. The method as defined in claim 1 wherein said substrates are separated from about 5 µm to about 20 µm.

3. The method as defined in claim 1 wherein said PDLC is comprised of a dispersion of discrete droplets containing nematic liquid crystal-rich material in a polymer-rich matrix.

4. The method as defined in claim 1 wherein said PDLC is comprised of regions of inter-connected spaces that are filled with nematic liquid crystal-rich material.

5. The method as defined in claim 4 where said nematic liquid crystal in the nematic-rich regions in the PDLC contains a high degree of orientational order and has its nematic director substantially aligned along its grating vector when no drive field is applied across said cell.

6. The method as defined in claim 1 wherein said coherent optical beams each have a wavelength in the ultraviolet spectrum.

7. The method as defined in claim 1 wherein said interfering optical beams are incident symmetrically about a direction normal to said cell in order to form said PDLC as an unslanted PDLC transmission grating.

8. The method as defined in claim 7 wherein said optical beams interfere at such an angle as to form said unslanted PDLC transmission grating with a grating period that is greater than half the wavelength of the light to be diffracted by the PDLC transmission grating during use of said transmission grating.

9. The method as defined in claim 8 where said nematic liquid crystal in the nematic-rich regions in the PDLC contains a high degree of orientational order and has its nematic director substantially aligned along its grating vector when no drive field is applied across said cell.

10. The method as defined in claim 7 wherein said optical beams interfere at such an angle as to form said unslanted PDLC transmission grating with a spatial frequency that is sufficiently high to prohibit propagating diffracted orders for normal incident light, thereby creating an electrooptic retarder with electrically tunable birefringence.

11. A method of fabricating a diffractive or non-dispersive polymer dispersed liquid crystal static optical device, comprising the steps of:

providing a non-chiral nematic liquid crystal in the form of a eutectic mixture, wherein said nematic liquid crystal has a positive dielectric anisotropy;

providing a photo-curable pre-polymer mixture;

mixing said nematic liquid crystal with said photo-curable pre-polymer mixture to form a homogeneous nematic/pre-polymer mixture, with said nematic liquid crystal being greater than 40% (by weight) of said combined homogeneous mixture;

providing a cell comprising a pair of spaced apart transparent substrates, without the inclusion of an alignment layer for aligning said nematic liquid crystal;

filling said cell with said homogeneous nematic/pre-polymer mixture; and photo-curing said nematic/pre-polymer mixture using a spatially inhomogeneous illumination source;

deriving said spatially inhomogeneous illumination source used to photo-cure the nematic/pre-polymer mixture from the interference of two coherent optical beams within said cell; and utilizing the above fabricating method to create said diffractive or non-dispersive static optical device in the form of a polymer dispersed liquid crystal (PDLC) exhibiting low scattering loss and high index modulation.

12. The method as defined in claim 11 wherein said substrates are separated from about 5 µm to about 20 µm.

13. The method as defined in claim 11 wherein said PDLC is comprised of a dispersion of discrete droplets containing nematic liquid crystal-rich material in a polymer-rich matrix.

14. The method as defined in claim 13 where said nematic liquid crystal in the nematic-rich regions in the PDLC contains a high degree of orientational order and has its nematic director substantially aligned along its grating vector.

15. The method as defined in claim 11 wherein said PDLC is comprised of regions of inter-connected spaces that are filled with nematic liquid crystal-rich material.

16. The method as defined in claim 15 where said nematic liquid crystal in the nematic-rich regions in the PDLC contains a high degree of orientational order and has its nematic director substantially aligned along its grating vector.

17. The method as defined in claim 11 wherein said coherent optical beams each have a wavelength in the ultraviolet spectrum.

18. The method as defined in claim 11 wherein said interfering optical beams are incident symmetrically about a direction normal to said cell in order to form said PDLC as an unslanted PDLC transmission grating.

19. The method as defined in claim 18 wherein said optical beams interfere at such an angle as to form said unslanted PDLC transmission grating with a grating period that is greater than half the wavelength of the light to be diffracted by the PDLC transmission grating during use of said transmission grating.

20. The method as defined in claim 18 wherein said optical beams interfere at such an angle as to form said unslanted PDLC transmission grating with a spatial frequency that is sufficiently high to prohibit propagating diffracted orders for normal incident light, thereby creating a retarder with electrically tunable birefringence.

* * * * *

UNITED STATES PATENT AND TRADEMARK OFFICE
CERTIFICATE OF CORRECTION

PATENT NO.       : 7,176,992 B1  
APPLICATION NO.  : 09/635606  
DATED            : February 13, 2007  
INVENTOR(S)      : John Kralik Page 1 of 1

It is certified that error appears in the above-identified patent and that said Letters Patent is hereby corrected as shown below:

<u>Col. 10 line 58</u>, delete "retarder with electrically tunable birefringence." and insert -- retarder. --, therefor.

Signed and Sealed this

Fourteenth Day of October, 2008

JON W. DUDAS  
*Director of the United States Patent and Trademark Office*